United States Patent
Achenbach et al.

Patent Number: 6,022,921
Date of Patent: Feb. 8, 2000

[54] ADDITION-CROSSLINKED SILICONE RUBBERS HAVING A LOW COMPRESSION SET

[75] Inventors: Frank Achenbach, Simbach/Inn; Christof Wörner, Burghausen; Armin Fehn, Emmerting; Otto Rothenaicher, Zeilarn, all of Germany

[73] Assignee: Wacker-Chemie GmbH, Munich, Germany

[21] Appl. No.: 09/186,323

[22] Filed: Nov. 4, 1998

[30] Foreign Application Priority Data

Nov. 20, 1997 [DE] Germany ............... 197 51 523

[51] Int. Cl.[7] ............... C08K 5/01; C08F 283/12; C08G 77/08; C08L 83/06
[52] U.S. Cl. ............... 524/481; 524/108; 524/263; 524/315; 524/474; 524/588; 525/479; 528/15
[58] Field of Search ............... 524/108, 263, 524/315, 474, 481, 450, 492, 493, 495, 496, 588; 528/15; 525/479

[56] References Cited

U.S. PATENT DOCUMENTS

| | | | |
|---|---|---|---|
| 4,526,953 | 7/1985 | Dallavia, Jr. | 528/15 |
| 5,120,810 | 6/1992 | Fujiki et al. | 524/263 |

FOREIGN PATENT DOCUMENTS

| | | |
|---|---|---|
| 2207936 | 2/1998 | Canada . |
| 0 388 201 | 3/1990 | European Pat. Off. . |
| 0 731 131 A1 | 9/1996 | European Pat. Off. . |
| 196 31 120 | 2/1998 | Germany . |

*Primary Examiner*—Peter A. Szekely
*Attorney, Agent, or Firm*—Brooks & Kushman P.C.

[57] ABSTRACT

The mechanical properties of addition-crosslinked silicone rubber are improved when the silicone rubber is brought into contact with a compound (A) having at least one aliphatically unsaturated multiple bond. In particular, the compression set is lowered.

19 Claims, 1 Drawing Sheet

ADDITION-CROSSLINKED SILICONE RUBBERS HAVING A LOW COMPRESSION SET

TECHNICAL FIELD

The invention relates to improving the mechanical properties of addition-crosslinked silicone rubber.

BACKGROUND ART

In numerous applications of addition-crosslinked silicone rubbers it is of particular importance for the silicone rubber not to be permanently deformed under pressure. For example, the ability of a seal to function would be reduced or completely destroyed if it were to behave plastically under pressure, since increasing plastic deformation would at the same time reduce the stress resulting from the compression of the silicone rubber, and it is this stress which guarantees the sealing function. Consequently, the plastic component of the deformation behavior under pressure of a silicone rubber used for such applications should be as small as possible. This material property can be quantified by means of the compression set in accordance with DIN 53 517 which enables different materials to be compared with one another. The compression set is determined by determining the thickness of a cylindrical test specimen before and after a compressive strain of 25% is maintained for 22 hours at a temperature of 175° C. If complete recovery occurs, i.e. the thickness of the test specimen is identical before and after the loading procedure, the compression set is 0%; if, on the other hand, the compressive strain of 25% applied during the test remains after unloading, the compression set is 100%.

Addition-crosslinked silicone rubbers typically have a compression set of up to 70%. To lower this, it is customary to subject silicone rubbers to heat treatment subsequent to the crosslinking reaction. The heat treatment is a thermal after-treatment of the silicone rubber which comprises, for example, storage for 4 hours at 200° C. with admission of fresh air. Very low compression sets can be achieved in this way, but shrinkage of the silicone rubber has to be accepted.

Known methods of reducing the compression set make use of the partial poisoning of the Pt catalyst, so that the addition-crosslinking silicone rubber compositions can still be crosslinked and these crosslinked silicone rubbers have reduced compression sets without heat treatment. For example, in EP-A-388 201 the compression set is reduced by admixing the addition-crosslinking silicone compositions with benzotriazole. However, the partial poisoning of the Pt catalyst leads to a reduction in the crosslinking rate of the addition-crosslinking silicone rubber compositions. Furthermore, the mechanical properties after compression for significantly longer than 22 hours and/or at elevated temperature, in particular the compression set, are unsatisfactory.

DISCLOSURE OF INVENTION

It is an object of the present invention to provide silicone rubber which has good mechanical properties and, in particular, has a low compression set without heat treatment. The invention provides a process for improving the mechanical properties of addition-crosslinked silicone rubber, wherein the silicone rubber is brought into contact with a compound (A) having at least one aliphatically unsaturated multiple bond.

The process has the advantage that it is not necessary to use any additives which reduce the crosslinking rate.

Furthermore, the silicone rubbers brought into contact with compound (A) have very low compression sets even after compression for longer than 22 hours and at temperatures higher than 175° C. Likewise, when compressed, these silicone rubbers display only a small decrease in the force necessary to maintain the compressive strain at temperatures above 50° C.

BEST MODE FOR CARRYING OUT THE INVENTION

Figure 1:
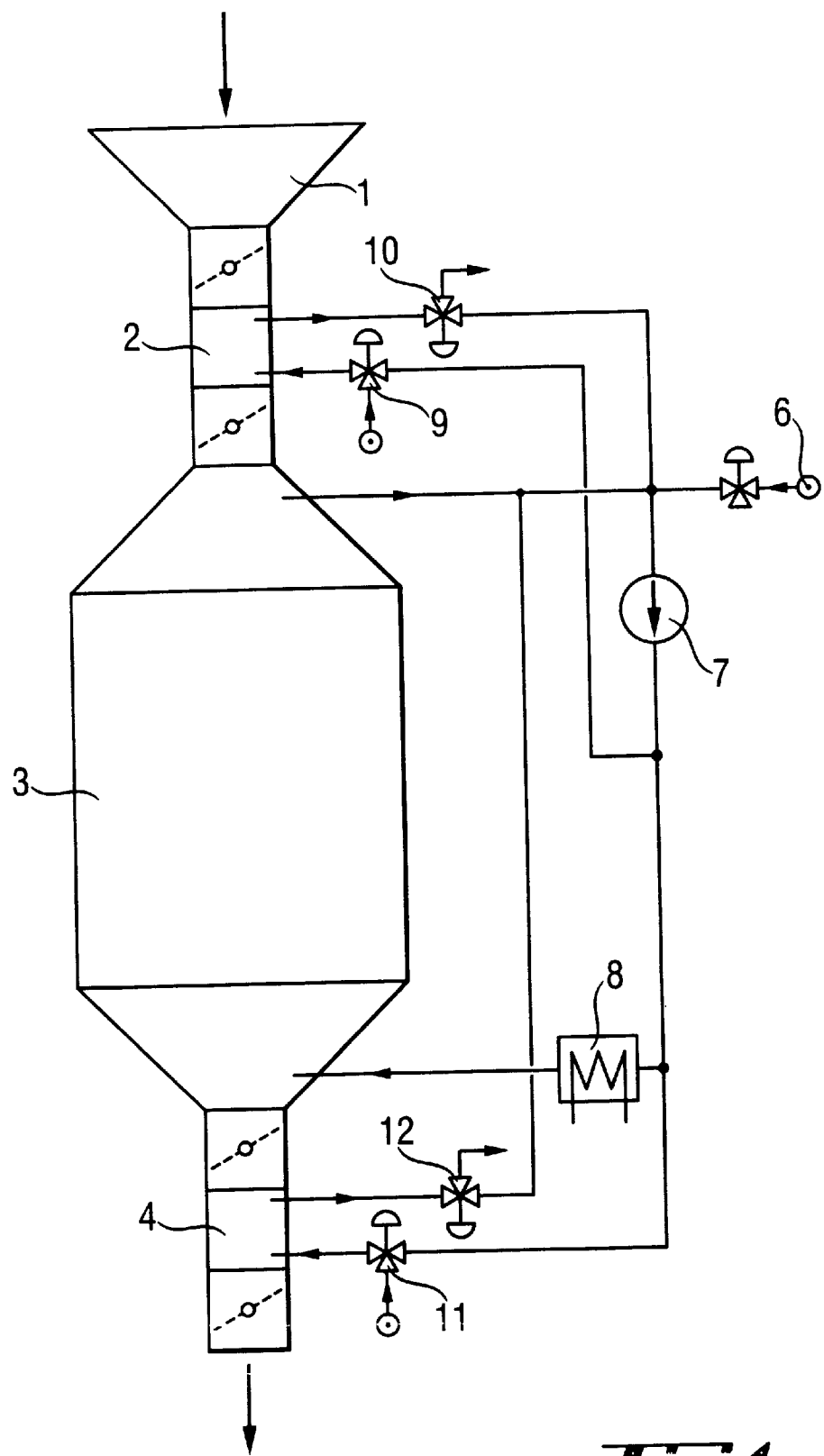
FIG. 1 illustrates an apparatus suitable for use in the process of the invention whereby moldings are treated with an unsaturated gaseous compound.

The addition-crosslinked silicone rubber is preferably prepared by crosslinking silicone rubber compositions which comprise the constituents (I) alkenyl-functional polyorganosiloxane (II) SiH-functional crosslinker and (III) hydrosilylation catalyst.

Constituent (I) of the silicone rubber composition is a polyorganosiloxane containing at least two alkenyl groups per molecule and preferably having a viscosity at 25° C. of from 0.1 to 500,000 Pa·s, in particular from 1 to 100 Pa·s.

The composition of the alkenyl-containing polyorganosiloxane (1) preferably corresponds to the average formula (1)

$$R_a R^1_b SiO_{(4-a-b)/2} \qquad (1),$$

where

R are identical or different monovalent, unsubstituted or halogen- or cyano-substituted $C_1$–$C_{10}$-hydrocarbon radicals which may be bound to silicon via a divalent organic group and contain aliphatic carbon—carbon multiple bonds, $R^1$ are identical or different monovalent, unsubstituted or halogen- or cyano-substituted, SiC-bonded $C_1$–$C_{10}$-hydrocarbon radicals which are free of aliphatic carbon-carbon multiple bonds, a is a non-negative number such that at least two radicals $R^1$ are present in each molecule, and b is a non-negative number so that (a+b) is in the range from 1.8 to 2.5.

The alkenyl groups R can undergo an addition reaction with an SiH-functional crosslinker. It is usual to use alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, and cyclohexenyl, preferably vinyl and allyl groups.

Divalent organic groups via which the alkenyl groups may be bound to silicon of the polymer chain may be, for example, oxyalkylene units such as those of the formula (2)

$$-(O)_c[(CH_2)_d O]_e- \qquad (2),$$

where c is 0 or 1, in particular 0, d is from 1 to 4, in particular 1 or 2, and e is from 1 to 20, in particular from 1 to 5.

The oxyalkylene units of the formula (2) are bound at the lefthand end to a silicon atom.

The radicals R can be bound to the polymer chain in any position, in particular at the terminal silicon atoms.

Examples of $R^1$ are alkyl groups such as methyl, ethyl, propyl, butyl and hexyl; aryl and alkaryl groups such as phenyl, tolyl, xylyl, mesityl, benzyl, β-phenylethyl, and naphthyl; or substituted groups, particularly halogen or cyano-substituted groups such as 3,3,3-trifluoropropyl, o-, p- and m-chlorophenyl, bromotolyl and β-cyanoethyl. Preferred substituents are fluorine, chlorine and bromine. $R^1$ preferably has from 1 to 6 carbon atoms. Particular preference is given to methyl and phenyl.

Constituent (I) can also be a mixture of various alkenyl-containing polyorganosiloxanes which differ, for example, in their alkenyl group content, the type of alkenyl group, or which differ structurally, or which differ in all of these respects.

The structure of the alkenyl-containing polyorganosiloxanes can be linear, cyclic or branched. Branched polyorganosiloxanes comprise not only monofunctional units, e.g. $RR^1_2SiO_{1/2}$ and $R^1_3SiO_{1/2}$, and difunctional units, e.g. $R^1_2SiO_{2/2}$ and $RR^1SiO_{2/2}$, but also trifunctional units, e.g. $RSiO_{3/2}$ and $R^1SiO_{3/2}$, and/or tetrafunctional units of the formula $SiO_{4/2}$. The content of these trifunctional and/or tetrafunctional units which lead to branched polyorganosiloxanes is typically very low, preferably not more than 20 mol %, in particular not more than 0.1 mol %. The alkenyl-containing polyorganosiloxane (I) may further comprise units of the formula (3)

$$-OSi(R^2R^3)R^5Si(R^2R^3)- \quad (3),$$

where
$R^2$ and $R^3$ have the meanings given above for R and $R^1$ and
$R^5$ is a divalent organic radical such as ethylene, propylene, phenylene, diphenylene or a radical of the formula (2).

Units of the formula (3) can be present in (I) in a proportion of up to 50 mol %.

Particular preference is given to the use of vinyl-containing polydimethylsiloxanes whose molecules correspond to the formula (4)

$$(ViMe_2SiO_{1/2})_2(ViMeSiO)_f(Me_2SiO)_g \quad (4),$$

where the non-negative integers f and g fulfill the following relationships: f+1>0, 50<(f+g)<20,000, preferably 200<(f+g)<1000, and 0<(f+1)/(f+g)<0.2.

Constituent (II) of the silicone rubber composition is an SiH-functional crosslinker whose composition corresponds to the average formula (5) below $$H_hR^6_iSiO_{(4-h-i)/2} \quad (5),$$

where
$R^6$ has the meaning of $R^1$ and h and i are non-negative integers with the proviso that 0.5<(h+i)<3.0 and 0<h<2, so that at least two silicon-bonded hydrogen atoms are present per molecule.

Preference is given to using a crosslinker (II) containing three or more SiH bonds per molecule. When using a crosslinker having only two SiH bonds per molecule, it is advisable to use an alkenyl-containing polyorganosiloxane (I) which has at least three alkenyl groups per molecule.

The hydrogen content of the crosslinker (II), which is based exclusively on the hydrogen atoms bound directly to silicon atoms (Si—H), is preferably in the range from 0.002 to 1.7% by weight of hydrogen, preferably from 0.1 to 1.7% by weight of hydrogen.

The SiH-functional crosslinker (II) preferably contains at least three and not more than 600 silicon atoms per molecule. Preference is given to using SiH crosslinkers (II) which contain from 4 to 200 silicon atoms per molecule.

The structure of the SiH crosslinker (II) can be linear, branched, cyclic or network-like. Linear and cyclic SiH crosslinkers (II) are organosiloxanes whose molecules are composed of units of the formulae $HR^6_2SiO_{1/2}$, $R^6_3SiO_{1/2}$, $HR^6SiO_{2/2}$ and $R^6_2SiO_{2/2}$, where $R^6$ is as defined above. Branched and network-like SiH crosslinkers (II) further comprise trifunctional units of the formulae $HSiO_{3/2}$, and/or $R^6SiO_{3/2}$ and/or tetrafunctional units of the formula $SiO_{4/2}$. With increasing content of trifunctional and/or tetrafunctional units, these crosslinkers (II) have a resin-like, network-like structure. The organic radicals $R^6$ present in the SiH crosslinker (II) are usually selected such that they are compatible with the radicals present in constituent (I), so that the constituents (I) and (II) are miscible.

As SiH crosslinkers (II), it is also possible to use combinations and mixtures of the SiH-functional crosslinkers (II) described here.

Particularly preferred SiH crosslinkers are linear polyorganosiloxanes of the formula (7)

$$(HR^7_2SiO_{1/2})_j(R^7_3SiO_{1/2})_k(HR^7SiO_{2/2})_l(R^7SiO_{2/2})_m \quad (7),$$

where
$R^7$ have the meanings of $R^1$ and the non-negative integers j, k, l and m fulfill the following relationships: (j+k)=2, (j+l)>2, 5<(l+m)<200 and 1<l/(l+m)<0.1.

The SiH-functional crosslinker is preferably present in the crosslinkable silicone rubber composition in such an amount that the molar ratio of SiH groups to alkenyl groups is from 0.5 to 5, in particular from 1.0 to 3.0.

Constituent (III) serves as catalyst for the addition reaction, described as a hydrosilylation, between the alkenyl groups of the constituent (1) and the silicon-bonded hydrogen atoms of the constituent (II). Numerous suitable hydrosilylation catalysts are described in the literature. In principle, it is possible to use all hydrosilylation catalysts corresponding to the prior art and used in addition-crosslinking silicone rubber compositions.

Hydrosilylation catalysts (III) which can be used are metals and their compounds, e.g. platinum, rhodium, palladium, ruthenium and iridium, preferably platinum. The metals may, if desired, be fixed on finely divided support materials such as activated carbon, metal oxides such as aluminum oxide or silicon dioxide.

Preference is given to using platinum and platinum compounds. Particular preference is given to those platinum compounds which are soluble in polyorganosiloxanes. Examples of soluble platinum compounds which can be used are the platinum-olefin complexes of the formulae $(PtCl_2\cdot olefin)_2$ and $H(PtCl_3\cdot olefin)$ where preference is given to using alkenes having from 2 to 8 carbon atoms, e.g. ethylene, propylene, isomers of butene and octene, or cycloalkanes having from 5 to 7 carbon atoms, e.g. cyclopentene, cyclohexene and cycloheptene. Further soluble platinum catalysts are the platinum-cyclopropane complex of the formula $(PtCl_2C_3H_6)_2$, the reaction products of hexachloroplatinic acid with alcohols, ethers and aldehydes or mixtures thereof or the reaction product of hexachloroplatinic acid with methylvinylcyclotetrasiloxane in the presence of sodium bicarbonate in ethanolic solution. Platinum catalysts containing phosphorus, sulfur and amine ligands can also be used, e.g. $(Ph_3P)_2PtCl_2$. Particular preference is given to complexes of platinum with vinylsiloxanes such as sym-divinyltetramethyldisiloxane.

The hydrosilylation catalyst (III) can also be used in microencapsulated form, where the finely divided solid which contains the catalyst and is insoluble in the polyorganosiloxane is, for example, a thermoplastic such as a polyester resin or a silicone resin. The hydrosilylation catalyst (III) can also be used in the form of an inclusion compound, for example in a cyclodextrin.

The amount of hydrosilylation catalyst (III) used depends on the desired crosslinking rate and also economic aspects. When using customary platinum catalysts, the content, based on platinum metal, in the crosslinkable silicone rubber composition is preferably in the range from 0.1 to 500 ppm by weight, in particular from 10 to 100 ppm by weight of platinum metal.

To achieve a sufficiently high mechanical strength of the silicone rubber, actively reinforcing fillers are preferably incorporated as constituent (IV) into the silicone rubber composition. Actively reinforcing fillers (IV) used are, in particular, precipitated and pyrogenic silicas and mixtures thereof. The specific surface area of these actively reinforcing fillers should be at least 50 m²/g, and preferably in the range from 100 to 400 m²/g, as determined by the BET method. Such actively reinforcing fillers are very well known materials in the field of silicone rubbers.

The use of hydrophobic fillers (IV) is particularly advantageous since they can be readily mixed directly into the constituent (I), while mixing-in hydrophilic fillers makes it necessary to add a hydrophobicizing agent. Methods of preparing hydrophobic fillers and their use in silicone rubbers are generally known.

The content of actively reinforcing filler (IV) in the crosslinkable silicone rubber composition is in the range from 0 to 60% by weight, preferably from 10 to 40% by weight.

If desired, the silicone rubber composition of the invention can further comprise, as constituent (V), other additives in a proportion of up to 70% by weight, preferably from 0.01 to 40% by weight. These additives can be, for example, fillers, dispersants, coupling agents, inhibitors, pigments, dyes, plasticizers, heat stabilizers, etc.

These include additives such as quartz flour, diatomaceous earth, clays, chalk, lithopones, carbon blacks, graphite, metal oxides, metal carbonates, metal sulfates, metal dusts, fibers, dyes, pigments, etc. In particular, resin-like polyorganosiloxanes consisting essentially of units of the formulae $R^9{}_3SiO_{1/2}$, $R^9SiO_{3/2}$ and $SiO_{4/2}$, if desired also $R^9{}_2SiO_{2/2}$, can be present in a proportion of up to 70% by weight, preferably up to 40% by weight, based on the total silicone rubber composition. The molar ratio of monofunctional to trifunctional or tetrafunctional units in these silicone resins is preferably in the range from 0.5:1 to 1.5:1. $R^9$ is any unsubstituted or halogen- or cyano-substituted hydrocarbon radical having from 1 to 12 carbon atoms. Preferred radicals $R^9$ are the methyl and phenyl radicals. Functional groups $R^9$, in particular alkenyl groups $R^9$, can also be present.

It is possible for, in particular, additives which serve to set the processing time and crosslinking rate of the curable silicone rubber composition in a targeted way to be present. These inhibitors and stabilizers are very well known in the field of addition-crosslinking compositions. Examples of customary inhibitors are acetylenic alcohols such as ethynylcyclohexanol and 2-methyl-3-butyn-2-ol, polymethylvinylcyclosiloxanes such as methylvinylcyclotetrasiloxane, low molecular weight silicone oils having methylvinylSiO$_{1/2}$ end groups, trialkyl cyanurates, alkylmaleates such as diallyl maleate and dimethyl maleate, alkyl fumarates such as diethyl fumarate and diallyl fumarate, organic hydroperoxides such as cumene hydroperoxide, tert-butyl hydroperoxide and pinane hydroperoxide, organic peroxides, organic sulfoxides, organic amines and amides, phosphines and phosphites, nitriles, diaziridines and oximes.

Compound (A) preferably has the formula (8) or (9)

$(R^{10})_2C=C(R^{10})_2$        (8),

$R^{10}C\equiv CR^{10}$        (9), where $R^{10}$ are identical or different radicals, namely hydrogen or monovalent, aliphatic $C_1$-$C_{20}$-hydrocarbon radicals which may bear halogen, —CN, —CO$_2$R$^{11}$, —OH, —OR$^{11}$, —COR$^{11}$, —COH or aromatic $C_5$–$C_{10}$-hydrocarbon radicals as substituents or organosiloxane radicals comprising from 1 to 50, in particular from 1 to 5, siloxane units and $R^{11}$ is $C_1$–$C_{10}$-hydrocarbon radical or an organosiloxane radical comprising from 1 to 50, in particular from 1 to 5, siloxane units.

The radicals $R^{10}$ can have further aliphatic double or triple bonds.

Preference is given to terminal alkenes and alkynes, i.e. $R^{10}$ in the formulae (8) and (9) are hydrogen atoms on one side. Preference is given to alkenes which are gaseous at 20° C. and 0.10 MPa.

Particularly preferred compounds (A) are ethene, propene, n-butene and isobutene, in particular ethene, since a very rapid reduction in the compression set can be achieved therewith.

In a first preferred embodiment, the compound (A) diffuses from the outside into the silicone rubber. As compound (A), it is possible to use all compounds having at least one aliphatically unsaturated multiple bond which are able to diffuse into the silicone elastomer.

The silicone rubber can be brought into contact with compound (A) during crosslinking or preferably afterward.

The treatment with compound (A) is preferably carried out at from 20 to 250° C., in particular at not more than 200° C. Unlike customary heat treatment at 150–200° C. in the absence of compound (A), low compression sets can be obtained on storage in the presence of compound (A) even at temperatures of 20° C. At higher temperatures, the heat treatment time can be drastically reduced by blanketing with compound (A).

In the treatment of the silicone rubber, compound (A) is preferably liquid or, in particular, gaseous. The treatment with compound (A) is preferably carried out at not less than 0.05 MPa, in particular at not less than 0.1 MPa, since higher pressure accelerates the diffusion rate of compound (A) in the silicone rubber.

In the treatment of the silicone rubber, compound (A) can be used in pure form or as a mixture with a liquid or a gas. If compound (A) is used in gaseous form, it can be mixed with air or an inert gas such as nitrogen, helium or argon.

The duration of the treatment of the silicone rubber with compound (A) depends on the molecular size of compound (A), temperature, pressure and thickness of the silicone rubber part. The time is usually from 1 minute to 10 hours.

FIG. 1 schematically shows an example of an apparatus for the treatment of silicone rubber moldings with compound (A). The moldings are introduced via the hopper (1) through a lock (2) into the vessel (3) containing compound (A). After storage of the moldings in the vessel (3), the moldings are removed via the lock (4) from the atmosphere containing compound (A). Compound (A) is fed in via a feed device (6), circulated continuously by pump (7) and can, if required, be heated by means of a heater (8). The use of this lock technology in conjunction with the valves (9–12) together with the use of compressed air makes it possible to carry out the process in a safe and environmentally friendly way.

In a second preferred embodiment, the compound (A) is liberated in the silicone rubber from one or more compounds (B). Compounds (B) are added to the silicone rubber composition prior to crosslinking.

In the second process variant, heat treatment or treatment of the moldings with compound (A) can be omitted. The shrinkage of the silicone rubber during heat treatment is thus avoided. Preference is given to compounds (B) which release compound (A) during and after crosslinking, since this enables very low compression sets to be achieved without other mechanical properties of the crosslinked silicone rubber being affected.

Compound (A) is liberated from compounds (B) by, for example, heat, irradiation with electromagnetic waves such as UV light, microwaves or treatment with ultrasound.

As compounds (B), preference is given to using compounds which are able to liberate compounds (A) on heating under the crosslinking conditions, namely from 30 to 250° C., preferably at not less than 50° C., in particular at not less than 100° C., preferably at not more than 200° C., in particular at not more than 180° C. This enables a further process step to be saved.

Preferred compounds (B) which liberate compounds (A) on heating include, but are not limited to (B1) to (B5) as defined below.

(B1) 2-Alkoxy-4-hydrocarbon-1,3-dioxolanes, preferably those of the formula (10)

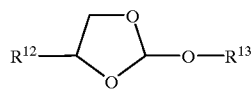

(10)

where $R^{12}$ and $R^{13}$ are any different or identical organic radicals.

Compounds (B1) liberate 1-olefins, in particular those of the formula $R^{12}$—HC=CH, with elimination of $CO_2$ and alcohol when the temperature is increased. $R^{12}$ and $R^{13}$ are preferably different or identical, unsubstituted or halogen- or cyano-substituted hydrocarbon radicals having from 1 to 18 carbon atoms. Particularly preferred radicals $R^{12}$ are alkyl radicals having from 1 to 6 carbon atoms, in particular the ethyl radical. Particularly preferred radicals $R^{13}$ are alkyl radicals having from 3 to 12 carbon atoms, in particular the n-hexyl and n-decyl radicals.

The content of 2-alkoxy-4-hydrocarbon-1,3-dioxolane (B1) is preferably from 0.01 to 20% by weight, particularly preferably from 0.1 to 10% by weight, in particular from 0.5 to 3% by weight, based on the mass of the silicone rubber.

(B2) Tertiary-butyl esters, preferably those of the formula (11)

$$R^{14}\text{—CO—O—C(CH}_3)_3 \quad (11),$$

where $R^{14}$ is any monovalent organic radical or a radical which comprises organosiloxane and hydrocarbon units and is bound via a divalent organic radical. Tertiary-butyl esters (B2) liberate isobutene when the temperature is increased.

Preferably $R^{14}$ is an alkyl radical having from 1 to 20 carbon atoms or an organosiloxane radical which comprises from 1 to 50 units of the formulae $R^9{}_3SiO_{1/2}$, $R^9{}_2SiO_{2/2}$, $R^9SiO_{3/2}$ and $SiO_{4/2}$, where $R^9$ is as defined above, and is bound via divalent alkyl radicals having from 1 to 20 carbon atoms.

The content of tertiary-butyl esters (B2) is preferably from 0.01 to 20% by weight, particularly preferably from 0.1 to 10% by weight, in particular from 0.5 to 3 % by weight, based on the mass of the silicone rubber.

(B3) Transition metal complexes which have compound (A) as ligands, are stable at room temperature and liberate compound (A) at above 30° C.

Preferred compounds (A) in the transition metal complexes (B3) are ethene, propene and isobutene, in particular ethene. Preferred transition metals are platinum, iron, palladium, molybdenum, rhenium, manganese, ruthenium, osmium, iridium, nickel and rhodium, in particular rhodium, platinum and palladium.

The content of transition metal complex (B3) is preferably from 0.001 to 10% by weight, particularly preferably from 0.01 to 8% by weight, in particular from 0.5 to 3% by weight, based on the mass of the silicone rubber.

(B4) β-Haloethyl-organosilicon compounds, preferably those of the formula (12)

$$R^{15}{}_3Si\text{—}CH_2CH_2\text{—}X \quad (12),$$

where $R^{15}$ are different or identical radicals selected from the group consisting of alkyl radicals having from 1 to 20 carbon atoms, alkoxy radicals having from 1 to 20 carbon atoms and organosiloxane radicals comprising from 1 to 50 units of the formulae $R^9{}_3SiO_{1/2}$, $R^9{}_2SiO_{2/2}$, $R^9SiO_{3/2}$ and $SiO_{4/2}$, where $R^9$ is as defined above, and X is fluorine, chlorine or bromine.

β-Haloethyl-organosilicon compounds (B4) liberate ethene when the temperature is increased. $R^{15}$ are preferably methoxy and ethoxy radicals, and X is preferably chlorine. The content of β-haloethyl-organosilicon compounds (B4) is preferably from 0.01 to 20% by weight, particularly preferably from 0.1 to 10% by weight, in particular from 0.5 to 5% by weight, based on the mass of the silicone rubber.

(B5) Microporous solids which are able to bind compound (A) at room temperature and liberate it again at elevated temperatures.

Preferred examples of microporous solids (B5) are zeolites, activated carbon, porous graphite, porous gas filter materials, silica gel, Porosil, ion-exchange resins, porous organic polymers or resins, e.g. crosslinked polystyrene resin which is used as column material for gel permeation chromatography, sugar charcoal and clathrates.

Particular preference is given to zeolites, in particular those described as molecular sieves, preferably having a pore diameter of from 0.3 to 20 nm.

The content of compound (A) in the microporous solids (B5) is preferably at least 0.1% by weight, in particular at least 0.5% by weight, and preferably not more than 60% by weight, in particular not more than 10% by weight.

The content of microporous solids (B5) including the bound compound (A) is preferably from 0.001 to 40% by weight, particularly preferably from 0.01 to 5% by weight, in particular from 0.1 to 2% by weight, based on the mass of the silicone rubber.

The amount of compounds (B) used depends on the silicone rubber employed in the particular case, so that low compression sets can be obtained without heat treatment while not changing the mechanical properties such as hardness, tensile strength and elongation at break.

The invention also provides addition-crosslinkable silicone rubber compositions comprising the constituents (I) alkenyl-functional polyorganosiloxane,
(II) SiH-functional crosslinker,
(III) hydrosilylation catalyst and
(B) compound which liberates compound (A).

It is also possible to combine both preferred embodiments by adding compound (B) to the silicone rubber prior to crosslinking and allowing compound (A) to diffuse from the outside into the crosslinked silicone rubber.

In addition, the uncrosslinked silicone rubber compositions can also be admixed with additives which trap by-products formed in the decomposition of the compound (B) in order to prevent any adverse effects on the crosslinked silicone rubber. For example, acid traps can be added.

Both compounds (A) and compounds (B) can be added in microencapsulated form to the uncrosslinked silicone rubber composition. Encapsulation materials which can be used are silicone resins which have alkyl and/or phenyl radicals, and/or organic thermoplastics. Encapsulation of compounds (A) and (B) in hollow spheres is also possible.

The silicone rubber compositions are particularly suitable for producing dimensionally stable silicone rubber moldings which are subject to static and/or dynamic mechanical loads, for example seals, sealing materials, damping elements, hoses and sheets, which are likewise subject matter of the invention.

In the following examples, unless indicated otherwise,
a) all pressures are 0.10 MPa (abs.);
b) all temperatures are 20° C.

EXAMPLES

Example 1

200.0 g of a two component liquid silicone rubber composition comprising equal parts of A and B components, which is obtainable under the name Elastosil® LR 3003/50 from Wacker Chemie GmbH, Germany, are intimately mixed on a roll mill at a roll temperature of 25° C. with 1.0, 2.0 or 4.0 g of 2ethoxy-4-hexyl-1,3-dioxolane for 5 minutes. This mixture is subsequently crosslinked in a hydraulic press at a temperature of 170° C. for 10 minutes to form a silicone elastomer sheet. The ca. 2 mm to 6 mm thick silicone elastomer sheets are not heat treated following demolding, but are characterized in the non-heat-treated state by measurement of the compression set and further elastomer properties.

Comparative Example C1(a) (Not According to the Invention)

Elastomer sheets are prepared as described in Example 1, but without 2-ethoxy4-hexyl-1,3-dioxolane (reference example)

Example 2

Elastomer sheets are prepared as described in Example 1, but the 2-ethoxy4-hexyl-1,3-dioxolane is replaced by the same amount of 2-ethoxy-4-decyl-1,3-dioxolane. The other constituents of the silicone rubber composition and the further processing remain unchanged.

Example 3

Elastomer sheets are prepared as described in Example 1, but the 2-ethoxy-4-hexyl-1,3-dioxolane is replaced by the same amount of tert-butyl undecanoate. The other constituents of the silicone rubber composition and the further processing remain unchanged.

Example 4

Elastomer sheets are prepared as described in Example 1, but the 2-ethoxy-4-hexyl-1,3-dioxolane is replaced by the same amount of dichlorotetraethylenedirhodium(I). The other constituents of the silicone rubber composition and the further processing remain unchanged.

Example 5

Molecular sieve 13X powder (Aldrich) is blanketed with ethene in a suitable apparatus for a number of hours. 2.0, 4.0 or 8.0 g of the ethene-saturated molecular sieve are intimately mixed into 200.0 g of a liquid silicone rubber composition comprising equal parts of A and B components, as in Example 1, on a roll mill at a roll temperature of 25° C. for 5 minutes. This mixture is subsequently crosslinked in a hydraulic press at a temperature of 170° C. for 10 minutes to form a silicone elastomer sheet. The demolded, ca. 2 mm to 6 mm thick silicone elastomer sheets are not heat treated, but are characterized in the non-heat-treated state by measurement of the compression set and further elastomer properties.

Comparative Example C1(b) (Not According to the Invention)

Elastomer sheets are prepared as described in Example 1, but the 2-ethoxy-4-hexyl-1,3-dioxolane is replaced by 40 mg of 1H-benzotriazole. The other constituents of the silicone rubber composition and the further processing remain unchanged.

Example 6

Cylindrical test specimens having a diameter of 13 mm and a specimen thickness of 6 mm are stamped from the sheet produced in Comparative Example C1(a). These test specimens are blanketed with ethene, propene or isobutene for 10 minutes at a temperature of 160° C. in a suitable apparatus. Subsequently, compression set, recovery force at 25% compression and the hardness are determined.

Characterization of the silicone elastomer properties:

The silicone elastomers produced as described in the preceding Examples, both those according to and not according to the invention, are evaluated by means of the following criteria:

a) Compression set in accordance with DIN 53 517 on cylindrical test specimens of the same dimensions (diameter: 13 mm, height: 6 mm) under the same compressive strain of 25% and different compression times of 22 hours, 7 and 28 days at 175° C.

b) Shore A hardness in accordance with DIN 53 505 c) The recovery force is determined on cylindrical test specimens of the same dimensions (diameter: 10 mm, height: 6 mm) under the same compressive strain of 25% and different compression times of 22 hours, 7 and 28 days at 175° C.

TABLE 1

Influence of 2-ethoxy-4-hexyl-1,3-dioxolane on the compression set and Shore A hardness of silicone elastomers

|  | Additive content [% by weight] | Compression set [%] | Hardness [Shore A] |
| --- | --- | --- | --- |
| Example C1(a) | None | 65 | 50 |
| Example 1 | 0.5 | 40 | 50 |
|  | 1.0 | 38 | 49 |
|  | 2.0 | 35 | 49 |

TABLE 2

Influence of 2-ethoxy-4-decyl-1,3-dioxolane on the compression set and Shore A hardness of silicone elastomers

|  | Additive content [% by weight] | Compression set [%] | Hardness [Shore A] |
|---|---|---|---|
| Example C1(a) | None | 65 | 50 |
| Example 2 | 0.5 | 42 | 49 |
|  | 1.0 | 40 | 49 |
|  | 2.0 | 32 | 48 |

TABLE 3

Influence of tert-butyl undecanoate on the compression set and Shore A hardness of silicone elastomers

|  | Additive content [% by weight] | Compression set [%] | Hardness [Shore A] |
|---|---|---|---|
| Example C1(a) | None | 65 | 50 |
| Example 3 | 0.5 | 48 | 50 |
|  | 1.0 | 40 | 50 |
|  | 2.0 | 43 | 48 |

TABLE 4

Influence of dichlorotetraethylenedirhodium(I) on the compression set and Shore A hardness of silicone elastomers

|  | Additive content [% by weight] | Compression Set [%] | Hardness [Shore A] |
|---|---|---|---|
| Example C1(a) | None | 65 | 50 |
| Example 4 | 0.5 | 35 | 51 |
|  | 1.0 | 27 | 49 |
|  | 2.0 | 19 | 48 |

TABLE 5

Influence of ethene-containing molecular sieve or benzotriazole on the compression set, recovery force at 25% compression and Shore A hardness of silicone elastomers

|  | Additive content [% by weight] | Compression time (25% compressive strain at 175° C.) | Compression set [%] | Recovery force of the test specimen [N] | Hardness [Shore A] |
|---|---|---|---|---|---|
| Example C1(a) | None | 0 h |  | 94 | 50 |
|  |  | 22 h | 65 | 55 |  |
|  |  | 7 days | 73 | 47 |  |
|  |  | 28 days | 79 | 42 |  |
| Example 5 | 1.0% of ethene-containing molecular sieve | 0 h |  | 96 | 50 |
|  |  | 22 h | 32 | 66 |  |
|  |  | 7 days | 41 | 59 |  |
|  |  | 28 days | 53 | 53 |  |
|  | 2.0% of ethene-containing molecular sieve | 0 h |  | 94 | 50 |
|  |  | 22 h | 18 | 80 |  |
|  |  | 7 days | 25 | 74 |  |
|  |  | 28 days | 46 | 68 |  |
|  | 4.0% of ethene-containing molecular sieve | 0 h |  | 95 | 49 |
|  |  | 22 h | 10 | 87 |  |
|  |  | 7 days | 20 | 78 |  |
|  |  | 28 days | 36 | 71 |  |
| Example C1(b) | 0.02% of 1H-benzo-triazole | 0 h |  | 94 | 50 |
|  |  | 22 h | 12 | 86 |  |
|  |  | 7 days | 40 | 62 |  |
|  |  | 28 days | 65 | 55 |  |

TABLE 6

Influence of the blanketing of addition-crosslinked silicone elastomers with olefins (160° C., 10 minutes) or H₂S (RT, 4 hours) on the compression set, recovery force at 25% compression and Shore A hardness

|  | Blanketing agent | Compression time (25% compressive strain at 175° C.) | Compression set [%] | Recovery force of the test specimen [N] | Hardness [Shore A] |
|---|---|---|---|---|---|
| Example C1(a) | none | 0 h | | 94 | 50 |
| | | 22 h | 65 | 55 | |
| | | 7 days | 73 | 47 | |
| | | 28 days | 79 | 42 | |
| Example 6 | Ethene | 0 h | | 94 | 50 |
| | | 22 h | 9 | 86 | |
| | | 7 days | 18 | 79 | |
| | | 28 days | 34 | 70 | |
| | Propene | 0 h | | 95 | 50 |
| | | 22 h | 17 | 82 | |
| | Isobutene | 0 h | | 93 | 49 |
| | | 22 h | 27 | 75 | |

In the claims, the terms "a" and "an" mean "one or more" unless stated to the contrary.

What is claimed is:

1. A process for improving the mechanical properties of addition- crosslinked silicone rubber, comprising contacting the silicone rubber with a compression set reducing effective amount of a compound (A) having at least one aliphatically unsaturated multiple bond.

2. The process as claimed in claim 1, wherein the compound (A) diffuses from the outside into the silicone rubber.

3. The process of claim 2, wherein the compound (A) comprises an ethylenically or ethylynically unsaturated hydrocarbon which is gaseous at 20° C. and 0.10 MPa.

4. The process of claim 3, wherein the compound (A) comprises one or more of the group consisting of ethylene, propylene, n-butylene, and isobutylene.

5. The process as claimed in claim 1, wherein the compound (A) is liberated from a composition (B) in the silicone rubber.

6. The process as claimed in claim 5, wherein composition (B) comprises one or more compositions selected from the group consisting of (B1) 2-alkoxy-4-hydrocarbon-1,3-dioxolanes, (B2) tertiary-butyl esters, (B3) transition metal complexes containing compound (A) as ligands, (B4) β-haloethyl-organosilicon compounds and (B5) microporous solids which are able to bind compound (A) at room temperature and liberate it again at elevated temperatures.

7. An addition-crosslinkable silicone rubber composition comprising the constituents (I) an alkenyl-functional polyorganosiloxane, (II) an SiH-functional crosslinker, (III) a hydrosilylation catalyst and (B) a composition which liberates compound (A) as claimed in claim 1.

8. The addition-crosslinkable silicone rubber of claim 7, wherein said composition (B) comprises one or more compositions selected from the group consisting of:

(B1) 2-alkoxy-4-hydrocarbon-1,3dioxolanes, (B2) tertiary-butyl esters, (B3) transition metal complexes containing compound (A) as ligands, (B4) β-haloethyl-organosilicon compounds and (B5) microporous solids which are able to bind compound (A) at room temperature and liberate it again at elevated temperatures.

9. A moulding which is able to be produced by crosslinking a silicone rubber composition as claimed in claim 7.

10. A molding which is able to be produced by crosslinking a silicone rubber composition as claimed in claim 8.

11. A process for improving the compression set of an addition-crosslinked silicone elastomer molded product, said process comprising contacting said molded part with a gaseous ethylenically or ethylynically unsaturated hydrocarbon compound (A) at a temperature of from about 20° C. to about 250° C. and a pressure greater than about 0.05 MPa.

12. The process of claim 11, wherein the molded product is contacted with compound (A) at a temperature of 20° C.

13. The process of claim 11, wherein the molded product is contacted with compound (A) at a pressure of at least about 0.10 MPa.

14. The process of claim 11, wherein the molded product is contacted with compound (A) at a temperature of from about 150° C. to about 200° C.

15. A process for improving the mechanical properties of an addition-crosslinked silicone rubber article, comprising contacting said silicone rubber article, following its preparation, with a compression set reducing amount of an olefin selected from the group consisting of ethylene, propylene, and mixtures thereof.

16. The process of claim 15 wherein said olefin is in the gas phase.

17. The process of claim 16, wherein said step of contacting occurs at a temperature of 20° C. to 200° C.

18. A low crosslinked silicone elastomer prepared by the process of a) crosslinking a crosslinkable composition to form a crosslinked elastomer product, followed by b) exposing said crosslinked elastomer product to an α-olefin in the gas phase at a temperature of from 20° C. to 200° C.

19. The process of claim 18 wherein said α-olefin is selected from the group consisting of ethylene, propylene, and mixtures thereof.

* * * * *